United States Patent [19]
Miki

[11] Patent Number: 6,137,344
[45] Date of Patent: Oct. 24, 2000

[54] HIGH SPEED CHARGE PUMP CIRCUIT HAVING FIELD EFFECT TRANSISTORS POSSESSING AN IMPROVED CHARGE TRANSFER EFFICIENCY

[75] Inventor: Atsunori Miki, Tokyo, Japan

[73] Assignee: NEC Corporation, Tokyo, Japan

[21] Appl. No.: 09/163,907

[22] Filed: Oct. 1, 1998

[30] Foreign Application Priority Data

Oct. 1, 1997 [JP] Japan .................................. 9-267604

[51] Int. Cl.[7] ........................................................ G05F 3/02
[52] U.S. Cl. .......................................... 327/536; 327/534
[58] Field of Search .................................. 327/536, 534, 327/390, 589, 590, 537; 307/110

[56] References Cited

U.S. PATENT DOCUMENTS

| 5,644,534 | 7/1997 | Soejima | 356/185.23 |
| 5,978,283 | 11/1999 | Hsu et al. | 365/189.09 |
| 5,982,223 | 11/1999 | Park et al. | 327/536 |

OTHER PUBLICATIONS

S. D'Arrigo et al., "A 5V–Only 256k Bit CMOS Flash EEPROM", pp. 132–133, IEEE International Solid–State Circuits Conference, 1989.

Primary Examiner—Tuan T. Lam
Assistant Examiner—Hiep Nguyen
Attorney, Agent, or Firm—Young & Thompson

[57] ABSTRACT

A charge pump circuit operable with at least first to fourth phase clock signals. The charge pump circuit includes charge transfer devices connected in series through nodes. The charge transfer devices are connected to first side capacitors which are applied with second and fourth phase clock signals alternately so as to control charge transfer operations of the charge transfer devices with the second and fourth phase clock signals. The nodes are connected to second side capacitors which are applied with first and third clock signals. Each of the charge transfer devices includes a charge transfer field effect transistor connected in series between adjacent two of the nodes on opposite sides of the each charge transfer device and a boosting field effect transistor connected in series between a gate of the charge transfer field effect transistor and an input side one of the adjacent two nodes. A gate of each of the boosting field effect transistor is connected to a follower one of the nodes that is closer to an output of the charge pump circuit than an output one of the adjacent two nodes by at least one of the charge transfer devices.

16 Claims, 17 Drawing Sheets

HIGH SPEED CHARGE PUMP CIRCUIT HAVING FIELD EFFECT TRANSISTORS POSSESSING AN IMPROVED CHARGE TRANSFER EFFICIENCY

BACKGROUND OF THE INVENTION

The present invention relates to a charge pump circuit, and more particularly to a high speed charge pump circuit having a field effect transistor possessing an improved charge transfer efficiency.

As non-volatile memories, electrically erasable programmable read only memory and flash memories have been known. It is necessary for erasing and programming processes to apply high voltages to the memories. Such high voltages are generated in the non-volatile memory, wherein a charge pump circuit is accommodated in the non-volatile memory.

FIG. 1 is a circuit diagram illustrative of one of the conventional charge pump circuits, wherein the conventional charge pump circuit is operated with two-phase clock signals and has n-type MOS field effect transistors and capacitors. The first conventional charge pump circuit has a series connection of n-type MOS field effect transistors M0, M1, M2, M3, M4 . . . Mn, wherein each of the n-type MOS field effect transistors M0, M1, M2, M3, M4 . . . Mn has a gate electrode and a drain electrode which are connected to each other. The n-type MOS field effect transistors M0, M1, M2, M3, M4 . . . Mn are connected in series through nodes P1, P2, P3, P4 . . . Pn−1. The drain electrode of the first stage n-type MOS field effect transistor M0 is connected through a node P0 to a high voltage line Vcc which is connected to a power supply such as a battery. A source of the final stage n-type MOS field effect transistor Mn is connected through a final stage output node Pn to an output terminal of the charge pump circuit. The nodes P1, P2, P3, P4 . . . Pn−1 are also connected to first terminals of capacitors C1, C2, C3, C4 . . . Cn−1. The capacitors C1, C2, C3, C4 . . . Cn−1 have second terminals which receive two-phase clock signals #1 and #2. FIG. 2 is a diagram illustrative of waveforms of the two-phase clock signals #1 and #2 to be inputted into the second terminals of the capacitors C1, C2, C3, C4 . . . Cn−1 of the first conventional charge pump circuit illustrated in FIG. 1. Each of the first phase clock signal #1 and the second phase clock signal #2 is alternately inputted into the capacitors C1, C2, C3, C4 . . . Cn−1. Namely, the first phase clock signal #1 is inputted into the odd number stage capacitors C1, C3, . . . , whilst the second phase clock signal #2 is inputted into the even number stage capacitors C2, C4, The charges are transferred from the smaller number stage node Pi through the MOS field effect transistor Mi to the larger number stage node Pi+1, whereby the voltage level is increased. Consequently, the charges supplied via the high voltage line Vcc are transferred through the nodes P1, P2, P3, P4 . . . Pn and the n-type MOS field effect transistors M0, M1, M2, M3, M4 . . . Mn into the final stage node Pn+1, whereby the voltage level is increased up to the predetermined and required high voltage level. The conventional charge pump circuit further has transistor diodes D1, D2, D3, D4 . . . Dn which are connected in series between the high voltage line Vcc and the nodes P1, P2, P3, P4 . . . Pn respectively. Gates and drains of the transistor diodes D1, D2, D3, D4 . . . Dn are connected to the high voltage line Vcc whilst sources of the transistor diodes D1, D2, D3, D4 . . . Dn are connected to the nodes P1, P2, P3, P4 . . . Pn respectively, so that the drains of the n-type MOS field effect transistors M1, M2, M3, M4 . . . Mn are applied with voltages of Vcc−Vtd1, Vcc−Vtd2, Vcc−Vtd3, Vcc−Vtd4, where Vtdi is the threshold voltage of the transistor diode Di.

The above conventional charge pump circuit has the following disadvantages. For example, it is now considered that the charge is transferred through the MOS field effect transistor M2. Assuming that the initial voltages or potentials of the nodes P2 and P3 are Vp2 and Vp3 respectively, if the first phase clock #1 is low level whilst the second phase clock #2 is high level, then the n-type MOS field effect transistor M2 turns ON, whereby the charge transfer through the n-type MOS field effect transistor M2 is made. Since the gate and drain of the n-type MOS field effect transistor M2, then the gate of the n-type MOS field effect transistor M2 is applied with a voltage level of $Vp2+\{Ci/(Ci+Cj)\}Vcc$, where Ci is the capacitance of the capacitor Ci and Cj is the parasitic capacitance of the node Pi. Therefore, the voltage or potential Vp3 of the node P3 may be increased to a maximum value of $Vp2+\{Ci/(Ci+Cj)\}Vcc-Vtm$, where Vtm is the threshold voltage of the n-type MOS field effect transistors M0, M1, M2, M3, M4 . . . Mn. This shows an inefficient charge transfer. Thereafter, the voltage level or potential Vp2 of the node P2 is decreased with the charge transfer, whereby the efficiency of the charge transfer is further dropped.

In Japanese laid-open patent publication No. 7-111095, a more efficient second conventional charge pump circuit is disclosed. FIG. 3 is a circuit diagram illustrative of the second conventional charge pump circuits, wherein the second conventional charge pump circuit is operated with four-phase clock signals and has n-type MOS field effect transistors and capacitors in addition boosting up MOS field effect transistors. The second conventional charge pump circuit has a series connection of n-type MOS field effect transistors M0, M1, M2, M3, M4 . . . Mn. The n-type MOS field effect transistors M0, M1, M2, M3, M4 . . . Mn are connected in series through nodes P1, P2, P3, P4 . . . Pn. The drain electrode of the first stage n-type MOS field effect transistor M0 is connected through a node P0 to a high voltage line Vcc which is connected to a power supply. A source of the final stage n-type MOS field effect transistor Mn is connected through a final stage output node Pn+1 to an output terminal of the charge pump circuit. The second conventional charge pump circuit also has n-type boost-up MOS field effect transistors N0, N1, N2, N3, N4 . . . Nn which are connected in series between the nodes P0, P1, P2, P4 . . . Pn and gates of the n-type MOS field effect transistors M0, M1, M2, M3, M4 . . . Mn. The second conventional charge pump circuit has capacitors C0, C1, C2, C3, C4, C5, C6, C7, C8 . . . C2n. The capacitors C0, C1, C2, C3, C4, C5, C6, C7, C8 . . . C2n have first terminals and second terminals which receive four-phase clock signals #1, #2, #3 and #4. The nodes P1, P2, P3, P4 . . . Pn are also connected to the first terminals of the odd number stage capacitors C1, C3, C5, C7 . . . C2n−1. The odd number stage capacitors C1, C3, C5, C7 . . . C2n−1 have second terminals which receive the first and third phase clock signals #1 and #3 alternately. The first terminals of the even number stage capacitors C0, C2, C4, C6, C8 . . . C2n are connected to gates of the n-type MOS field effect transistors M0, M1, M2, M3, M4 . . . Mn. The even number stage capacitors C0, C2, C4, C6, C8 . . . C2n have second terminals which receive the second and fourth phase clock signals #2 and #4 alternately. The n-type boost-up MOS field effect transistors N0, N1, N2, N3, N4 . . . Nn have gates which are connected to the next stage nodes P1, P2, P3, P4, P5 . . . Pn+1. Those next stage nodes P1, P2, P3, P4, P5 . . . Pn+1 are also connected to the first terminals of the odd number stage capacitors C1, C3, C5, C7 . . .

C2n−1 having the second terminals which receive the first and third phase clock signals #1 and #3 alternately. The second conventional charge pump circuit further has transistor diodes D1, D2, D3, D4 . . . Dn which are connected in series between the high voltage line Vcc and the nodes P1, P2, P3, P4 . . . Pn respectively. Gates and drains of the transistor diodes D1, D2, D3, D4 . . . Dn are connected to the high voltage line Vcc whilst sources of the transistor diodes D1, D2, D3, D4 . . . Dn are connected to the nodes P1, P2, P3, P4 . . . Pn respectively. FIG. 4 is a diagram illustrative of waveforms of the individual nodes P1, P2, P3, P4 . . . Pn of the second conventional charge pump circuit in operation as illustrated in FIG. 3.

When the time is T1, the individual nodes P1, P2, P3, P4 . . . Pn have voltages Vp1(T1), Vp2(T1), Vp3(T1), Vp4(T1), . . . Vpn(T1). The second and fourth phase clock signals #2 and #4 are in the low level. The gates of the n-type boost-up MOS field effect transistors N0, N1, N2, N3, N4 . . . Nn are connected to the next stage nodes P1, P2, P3, P4, P5 . . . Pn+1, for which reason the voltages Vp1(T1), Vp2(T1), Vp3(T1), Vp4(T1), . . . Vpn(T1) of the individual nodes P1, P2, P3, P4 . . . Pn are applied to the gates of the n-type boost-up MOS field effect transistors N0, N1, N2, N3, N4 . . . Nn. The gates of the n-type MOS field effect transistors M0, M1, M2, M3, M4 . . . Mn have voltages Vq0(T1), Vq1(T1), Vq2(T1), Vq3(T1), Vq4(T1), . . . Vqn(T1) respectively.

When the charge pump circuit is in the initial state of the boost-up process or where the drain of the transistor is connected to the high voltage line, the following equation is given.

$$Vpn+1(T1) - Vpn(T1) > Vtn$$

where Vtn is a threshold voltage of the transistor Ni.

Therefore, Vqn(T1)=Vpn(T1) is given.

In the middle and later time periods of the boost-up process or in the initial time pried of the boost-up process, the transistor on the output side stage has voltage relationships defined by the following equation.

$$Vpn+1(T1) - Vpn(T1) < Vtn$$

Therefore, Vpn(T1)=Vpn+1(T1)−Vtn is given.

When the time is T2, the first phase clock signal #1 is low level, and the voltage levels Vp1(T2) and Vp3(T2) are dropped to the following levels respectively.

$$Vp1(T1) - \{Ci/(Ci+Cj)\}Vcc$$

$$Vp3(T) - \{Ci/(Ci+Cj)\}Vcc$$

When the time is T3, then the fourth phase clock signal #4 is high level, and the voltage levels Vq0(T3) and Vq2(T3) are given as follows respectively.

$$Vq0(T1) + \{Ck/(Ck+Cg)\}Vcc$$

$$Vq2(T1) + \{Ck/(Ck+Cg)\}Vcc$$

where Ck is the capacitance of the capacitors connected to the gates of the transistors M0 . . . Mn, and Cg is the parasitic capacitance of nodes Q0, Q1, Q2, Q3, Q4, . . . Qn which are connected to the gates of the transistors M0 . . . Mn respectively.

The gate voltage of the second conventional charge pump circuit is higher than that of the first conventional charge pump circuit by about $\{Ck/(Ck+Cg)\}Vcc$. This means that the four phase clock signal second conventional charge pump circuit shows more efficient charge transfer than the two phase clock signal first conventional charge pump circuit.

When the time is T4, the fourth phase clock signal #4 is low level, whereby all of the transistors M0 . . . Mn turn OFF.

When the time is T5, then the voltage levels Vp1(T5), Vp3(T5) are risen whereby the second conventional charge pump circuit enters into the same operation as when the time is T1 but different in phase by 180 degrees therefrom.

The above sequential operations of the second conventional charge pump circuit are repeated so that the charges are transferred to the final stage node Pn+1 connected to the source of the final stage transistor Mn, whereby the final stage node Pn+1 has the required voltage level.

The above second conventional charge pump circuit has the following disadvantages. Even the potential of the output stage is risen, in the time period between T1 and T2, a maximum potential difference between the voltage levels Vpn(T1) and Vpn+1(T1) is only Vcc, for which reason a small amount of charges is transferred to the node Qn(T1), whereby the voltage levels of the nodes Q0 . . . On connected to the gate voltages of the transistors M0 . . . Mn show almost no rise, and thus only an additional voltage level added in additional boosting up can be effected to transfer the charge to the output side.

In the above circumstances, it had been required to develop a novel charge pump circuit free from the above problems or disadvantages.

SUMMARY OF THE INVENTION

Accordingly, it is an object of the present invention to provide a novel charge pump circuit free from the above problems.

It is a further object of the present invention to provide a novel charge pump circuit which is capable of highly efficient voltage rising.

It is a still further object of the present invention to provide a novel charge pump circuit which is capable of rising a voltage in a short time period.

It is yet a further object of the present invention to provide a novel charge pump circuit requiring no further increase in area of integrated circuits in which the charge pump circuit is integrated.

The present invention provides a charge pump circuit operable with at least first to fourth phase clock signals. The charge pump circuit comprises a series connection of charge transfer devices through Nodes. The charge transfer devices are connected to first side capacitors which are applied with second and fourth phase clock signals alternately so as to control charge transfer operations of the charge transfer devices with the second and fourth phase clock signals. The nodes are also connected to second side capacitors which are applied with first and third clock signals. Each of the charge transfer devices includes a charge transfer field effect transistor connected in series between adjacent two of the nodes on opposite sides of the each charge transfer device and a boosting field effect transistor connected in series between a gate of the charge transfer field effect transistor and an input one of the adjacent two nodes. A gate of each of the boosting field effect transistor is connected to a follower one of the nodes, which is positioned closer to an output of the charge pump circuit than an output side one of the adjacent two nodes by at least one of the charge transfer devices. The novel charge pump circuit is capable of high speed, voltage increasing, operation in a short time period without, providing any additional transistor.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DESCRIPTION OF THE PREFERRED EMBODIMENTS

Figure 1:
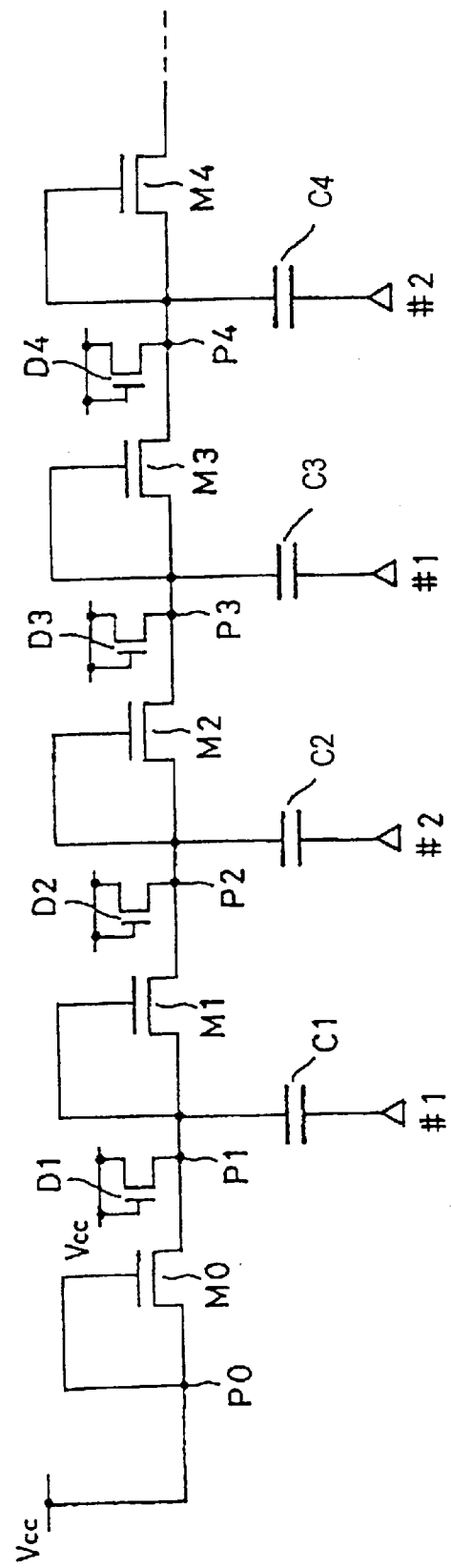
FIG. 1 is a circuit diagram illustrative of the first conventional charge pump circuits, wherein the conventional charge pump circuit is operated with two-phase clock signals and has n-type MOS field effect transistors and capacitors.
Figure 2:
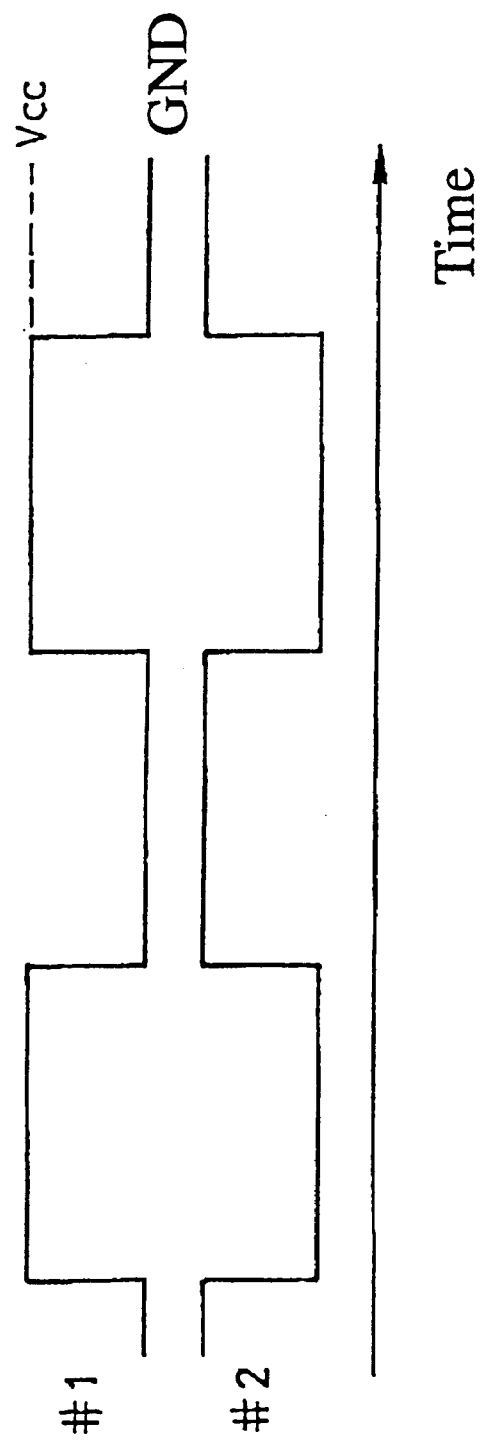
FIG. 2 is a diagram illustrative of waveforms of the two-phase clock signals #1 and #2 to be inputted into the second terminals of the capacitors C1, C2, C3, C4 . . . Cn−1 of the first conventional charge pump circuit illustrated in FIG 1.

The first aspect of the present invention provides a charge pump circuit operable with at least first to fourth phase clock signals. The charge pump circuit comprises a series connection of charge transfer devices through nodes, the charge transfer devices being connected to first side capacitors which are applied with second and fourth phase clock signals alternately so as to control charge transfer operations of the charge transfer devices with the second and fourth phase clock signals. The nodes are also connected to second side capacitors which are applied with first and third clock signals. Each of the charge transfer devices includes a charge transfer field effect transistor connected in series between adjacent two of the nodes in opposite sides of the each charge transfer device and a boosting field effect transistor connected in series between a gate of the charge transfer field effect transistor and an input side one of the adjacent two nodes. A gate of each of the boosting field effect transistor is connected to a follower one of the nodes, which is positioned closer to an output side of the charge pump circuit than an output side one of the adjacent two nodes by at least one stage. The first novel charge pump circuit is capable of high speed voltage rising operation in a short time period without, however, providing any additional transistors.

It is preferable that the follower one of the nodes is positioned closer to the output side than the output side one of the adjacent two nodes by two stages.

It is also preferable that an input side of the charge transfer device on a first stage is connected to a high voltage line supplying a power voltage level so that the charge pump circuit is operated to rise the power voltage level to a predetermined higher voltage level than the power voltage level.

It is further preferable that the each charge transfer device further has an active device with a predetermined threshold voltage connected between the high voltage line and the output side one of the adjacent two nodes, so that the active device is operated to supply the output side one of the adjacent two nodes with a subtraction voltage level which corresponds to a subtraction of the predetermined threshold voltage from the power voltage level.

It is furthermore preferable that the active device comprises a transistor diode.

It is also preferable that an input side of the charge transfer device on a first stage is connected to a ground voltage line supplying a ground voltage level so that the charge pump circuit is operated to fall the ground voltage level to a predetermined lower voltage level than the ground voltage level.

It is also preferable that the each charge transfer device further has an active device with a predetermined threshold voltage connected between the ground line and the output side one of the adjacent two nodes, so that the active device is operated to supply the output side one of the adjacent two nodes with a subtraction voltage level which corresponds to a subtraction of the predetermined threshold voltage from the ground voltage level.

It is further preferable that the active device comprises a transistor diode.

The second aspect of the present invention provides a charge pump circuit operable with first to fourth phase clock signals. The charge pump circuit comprises a series connection of charge transfer devices through nodes. The charge transfer devices are connected to first side capacitors which are applied with second and fourth phase clock signals alternately so as to control charge transfer operations of the charge transfer devices with the second and fourth phase clock signals. The nodes are also connected to second side capacitors which are applied with first and third clock signals. Each of the charge transfer devices includes a charge transfer field effect transistor connected in series between adjacent two of the nodes in opposite sides of the each charge transfer device and a boosting field effect transistor connected in series between a gate of the charge transfer field effect transistor and an input side one of the adjacent two nodes. An input side of the charge transfer device on a first stage is connected to a high voltage line supplying a power voltage level so that the charge pump circuit is operated to rise the power voltage level to a predetermined higher voltage level than the power voltage level. A gate of each of the boosting field effect transistor is connected to a follower one of the nodes, which is positioned closer to an output side of the charge pump circuit than an output side one of the adjacent two nodes by at least one stage. The second novel charge pump circuit is capable of high speed voltage rising operation in a short time period without, however, providing any additional transistors.

It is preferable that the follower one of the nodes is positioned closer to the output side than the output side one of the adjacent two nodes by two stages.

It is further preferable that the each charge transfer device further has an active device with a predetermined threshold voltage connected between the high voltage line and the output side one of the adjacent two nodes, so that the active device is operated to supply the output side one of the adjacent two nodes with a subtraction voltage level which corresponds to a subtraction of the predetermined threshold voltage from the power voltage level.

It is furthermore preferable that the active device comprises a transistor diode.

The third aspect of the present invention provides a charge pump circuit operable with first to fourth phase clock signals. The charge pump circuit comprises a series connection of charge transfer devices through nodes. The charge transfer devices are connected to first side capacitors which are applied with second and fourth phase clock signals alternately so as to control charge transfer operations of the charge transfer devices with the second and fourth phase clock signals. The nodes are also connected to second side capacitors which are applied with first and third clock signals. Each of the charge transfer devices includes a charge transfer field effect transistor connected in series between adjacent two of the nodes in opposite sides of the each charge transfer device and a boosting field effect transistor connected in series between a gate of the charge transfer field effect transistor and an input side one of the adjacent two nodes. An input side of the charge transfer device on a first stage is connected to a ground voltage line supplying a ground voltage level so that the charge pump circuit is operated to fall the ground voltage level to a predetermined lower voltage level than the ground voltage level. A gate of each of the boosting field effect transistor is connected to a follower one of the nodes, which is positioned closer to an output side of the charge pump circuit than an output side one of the adjacent two nodes by at least one stage. The third novel charge pump circuit is capable of high speed voltage rising operation in a short time period without, however, providing any additional transistor.

It is preferable that the follower one of the nodes is positioned closer to the output side than the output side one of the adjacent two nodes by two stages.

It is further preferable that the each charge transfer device further has an active device with a predetermined threshold voltage connected between the ground line and the output side one of the adjacent two nodes, so that the active device is operated to supply the output side one of the adjacent two nodes with a subtraction voltage level which corresponds to a subtraction of the predetermined threshold voltage from the ground voltage level.

It is furthermore preferable that the active device comprises a transistor diode.

PREFERRED EMBODIMENTS

First Embodiment

A first embodiment according to the present invention will be described in detail with reference to FIG. 5 which is a circuit diagram illustrative of the first novel charge pump circuits, wherein the first novel charge pump circuit is operated with four-phase clock signals. The first novel charge pump circuit has a series connection of n-type MOS field effect transistors M0, M1, M2, M3, M4 . . . Mn. The n-type MOS field effect transistors M0, M1, M2, M3, M4 . . . Mn are connected in series through nodes P1, P2, P3, P4 . . . Pn. The drain electrode of the first stage n-type MOS field effect transistor M0 is connected through a node P0 to a high voltage line Vcc which is connected to a power supply. A source of the final stage n-type MOS field effect transistor Mn is connected through a final stage output node Pn+1 to an output terminal of the charge pump circuit. The first novel charge pump circuit also has n-type boost-up MOS field effect transistors N0, N1, N2, N3, N4 . . . Nn which are connected in series between the nodes P0, P1, P2, P4 . . . Pn and gates of the n-type MOS field effect transistors M0, M1, M2, M3, M4 . . . Mn. The first novel charge pump circuit has capacitors C0, C1, C2, C3, C4, C5, C6, C7, C8 . . . C2n. The capacitors C0, C1, C2, C3, C4, C5, C6, C7, C8 . . . C2n have first terminals and second terminals which receive four-phase clock signals #1, #2, #3 and #4. The nodes P1, P2, P3, P4 . . . Pn are also connected to the first terminals of the odd number stage capacitors C1, C3, C5, C7 . . . C2n 1. The odd number stage capacitors C1, C3, C5, C7 . . . Cn–1 have second terminals which receive the first and third phase clock signals #1 and #3 alternately. The first terminals of the even number stage capacitors C0, C2, C4, C6, C8 . . . C2n are connected to gates of the n-type MOS field effect transistors M0, M1, M2, M3, M4 . . . Mn. The even number stage capacitors C0, C2, C4, C6, C8 . . . C2n have second terminals which receive the second and fourth phase clock signals #2 and #4 alternately. The n-type boost-up MOS field effect transistors N0, N1, N2, N3, N4 . . . Nn have gates which are connected to the third next stage nodes P3, P4, P5, P6, P7 . . . Pn+1. Those third next stage nodes P3, P4, P5, P6, P7 . . . Pn+1 are also connected to the first terminals of the odd number stage capacitors C5, C7, . . . C2n–1 having the second terminals which receive the first and third phase clock signals #1 and #3 alternately. The first novel charge pump circuit further has n-type transistor diodes D1, D2, D3, D4 . . . Dn which are connected in series between the high voltage line Vcc and the nodes P1, P2, P3, P4 . . . Pn respectively. Gates and drains of the n-type transistor diodes D1, D2, D3, D4 . . . Dn are connected to the high voltage line Vcc whilst sources of the n-type transistor diodes D1, D2, D3, D4 . . . Dn are connected to the nodes P1, P2, P3, P4 . . . Pn respectively. FIG. 6 is a diagram illustrative of waveforms of four phase clock signals #1, #2, #3 and #4 to be applied to the capacitors in the first novel charge pump circuit.

Namely, the gates of the n-type boost-up MOS field effect transistors N0, N1, N2, N3, N4 . . . Nn are connected to the third next stage nodes P3, P4, P5, P6, P7 . . . Pn+1 which are further connected to the first terminals of the third next stage capacitors C5, C7, . . . C2n−1 having the second terminals which receive the first and third phase clock signals #1 and #3 alternately, so that the gates of the n-type boost-up MOS field effect transistors N0, N1, N2, N3, N4 . . . Nn receive the third next stage clock signals #1 and #3. For example, the gate of the first stage n-type boost-up MOS field effect transistor N0 is connected to the fourth stage node P3 connected to the capacitor C5 so that the gate of the first stage n-type boost-up MOS field effect transistor N0 receives the first phase clock signal #1 through the capacitor C5. Further, the gate of the second stage n-type boost-up MOS field effect transistor N1 is connected to the fifth stage node P4 connected to the capacitor C7 so that the gate of the second stage n-type boost-up MOS field effect transistor N1 receives the third phase clock signal #3 through the capacitor C7.

Figure 5:
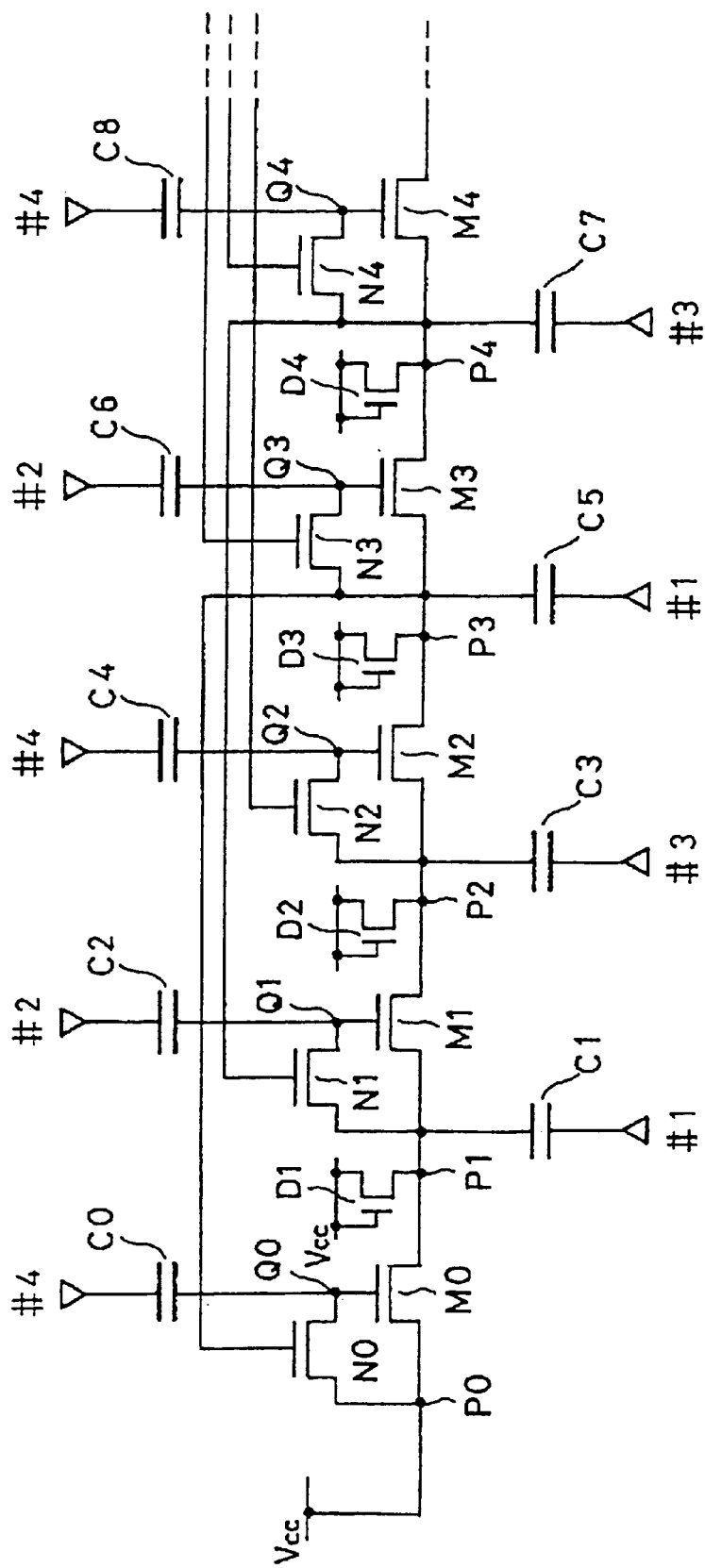
FIG. 5 is a circuit diagram illustrative of the first novel charge pump circuits, wherein the first novel charge pump circuit is operated with four-phase clock signals.
Figure 6:
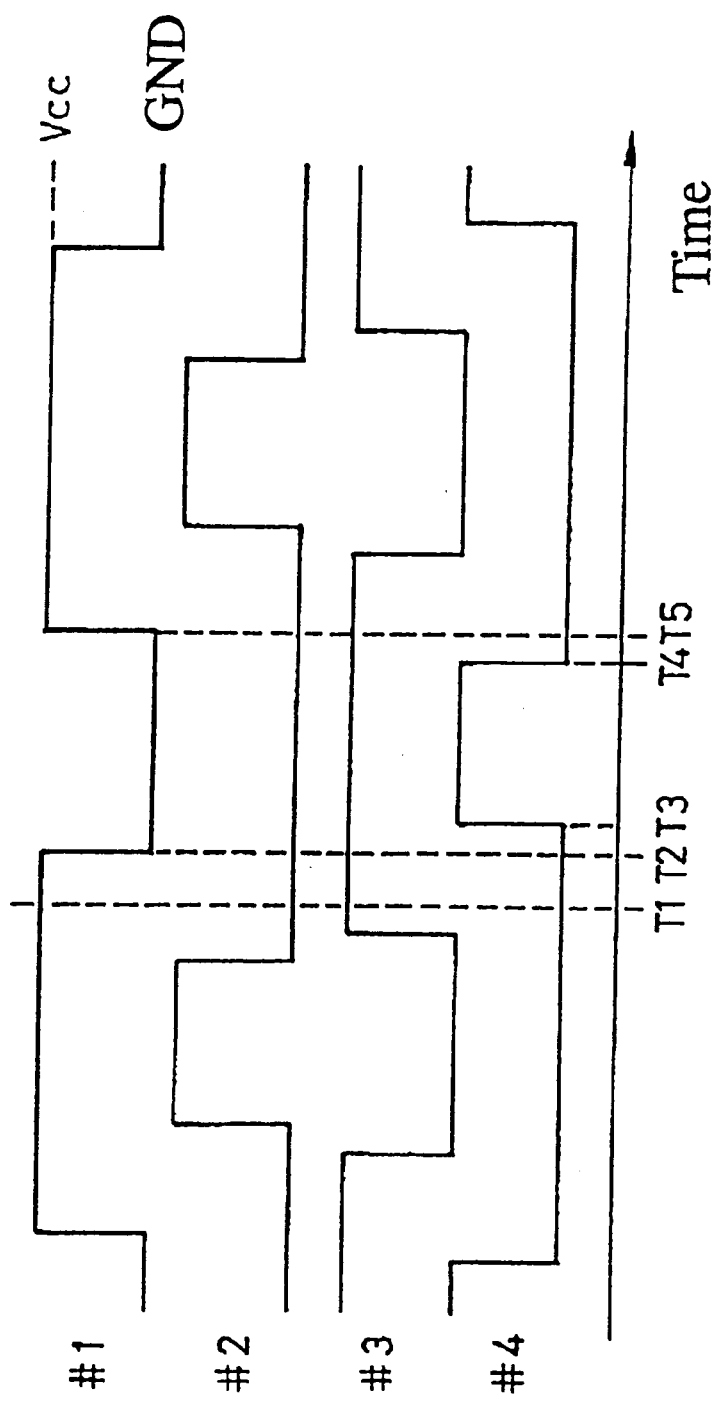
FIG. 6 is a diagram illustrative of waveforms of four phase clock signals #1, #2, #3 and #4 to be applied to the capacitors in the first novel charge pump circuit illustrated in FIG. 5.
Figure 7:
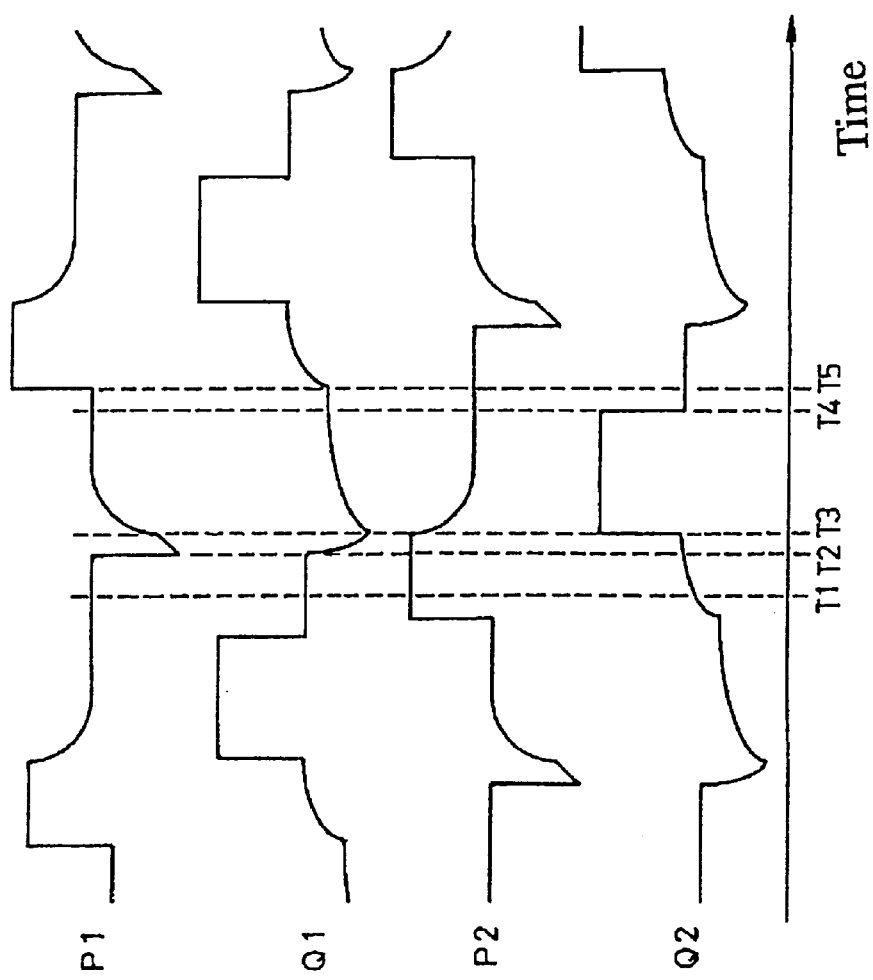
FIG. 7 is a diagram illustrative of waveforms of the individual nodes P1, P2, Q1, and Q2 of the first novel charge pump circuit in operation illustrated in FIG. 5.

FIG. 7 is a diagram illustrative of waveforms of the individual nodes P1, P2, Q1, and Q2 of the first novel charge pump circuit in operation as illustrated in FIG. 5. When the time is T1, the second to fourth nodes P1, P2, P3 have voltages Vp1(T1), Vp2(T1) and Vp3(T1). The second and fourth phase clock signals #2 and #4 are in the low level, whilst the first and third phase clock signals #1 and #3 are in the high level. The gates of the n-type boost-up MOS field effect transistors N0, N1 and N2 are connected to the third next stage nodes P3, P4 and P5, for which reason the voltages Vp3(T1), Vp4(T1) and Vp5(T1) of the third next stage nodes P3, P4, P5 are applied to the gates of the n-type boost-up MOS field effect transistors N0, N1 and N2. The gates of the n-type MOS field effect transistors M0, M1 and M2 have voltages Vq0(T1), Vq1(T1), Vq2(T1) and Vq3(T1) respectively.

When the charge pump circuit is in the initial state of the boost-up process or where the drain of the transistor is connected to the high voltage line, the following equation is given.

Vpn+1(T1)−Vpn(T1)>Vtn where Vtn is a threshold voltage of the transistor Ni.

Therefore, Vqn(T1)=Vpn(T1) is given.

In the middle and later time periods of the boost-up process or in the initial time pried of the boost-up process, the transistor on the output side stage has voltage relationships defined by the following equation.

Vpn+3(T1)−Vpn(T1)<Vtn

Therefore, Vpn(T1)=Vpn+3(T1)−Vtn is given.

Since the maximum potential difference between the voltage levels Vpn(T1) and Vpn+3(T1) is 2×Vcc, the gates of the n-type boost-up MOS field effect transistors N0 . . . Nn receive higher voltages than the second conventional charge pump circuit, whereby the charge transfer capabilities of the n-type boost-up MOS field effect transistors N0 . . . Nn are improved, thereby to allow a high speed rising of the potentials Vq0(T1) . . . Vqn(T1) of the nodes Q0 . . . Qn up to the required and predetermined high voltage levels respectively.

When the time is T2, the first phase clock signal #1 is low level, and the voltage levels Vp1(T2) and Vp3(T2) are dropped to the following levels respectively.

Vp1(T1)−{Ci/(Ci+Cj)}Vcc

Vp3(T1)−{Ci/(Ci+(j)}Vcc

Since the nodes Q0 and Q2 have been applied with the high voltages in the time period from T1 to T2, the transistors M0 and M3 have turned ON thereby to have started the charge transfer during the time period from T1 to T2.

When the time is T3, then the fourth phase clock signal #4 is high level, and the voltage levels Vq0(T3) and Vq2(T3) of the nodes Q0 and Q2 have already been risen and further boosted up by {Ck/(Ck+Cg)}Vcc, for which reason the high efficiency of the charge transfer through the transistors M0 and M2 to the output side is further improved.

Vq0(T1)+{Ck/(Ck+Cg)}Vcc

Vq2(T1)+{Ck/(Ck+Cg)}Vcc where Ck is the capacitance of the capacitors connected to the gates of the transistors M0 . . . Mn, and Cg, is the parasitic capacitance of nodes Q0, Q1, Q2, Q3, Q4, . . . Qn which are connected to the gates of the transistors M0 . . . Mn respectively.

When the time is T4, the fourth phase clock signal #4 is low level, whereby all of the transistors M0 . . . Mn turn OFF again.

When the time is T5, then the voltage levels Vp1(T5), Vp3(T5) of the nodes P1 and P3 are risen whereby the first novel charge pump circuit enters into the same operation as when the time is T1 but different in phase by 180 degrees therefrom.

The above sequential operations of the first novel charge pump circuit are repeated so that the charges are transferred to the final stage node Pn+1 connected to the source of the final stage transistor Mn, whereby the final stage node Pn+1 has the required voltage level. The first novel charge pump circuit is capable of high speed voltage rising operation in a short time period without, however, providing any additional transistor.

Figure 3:
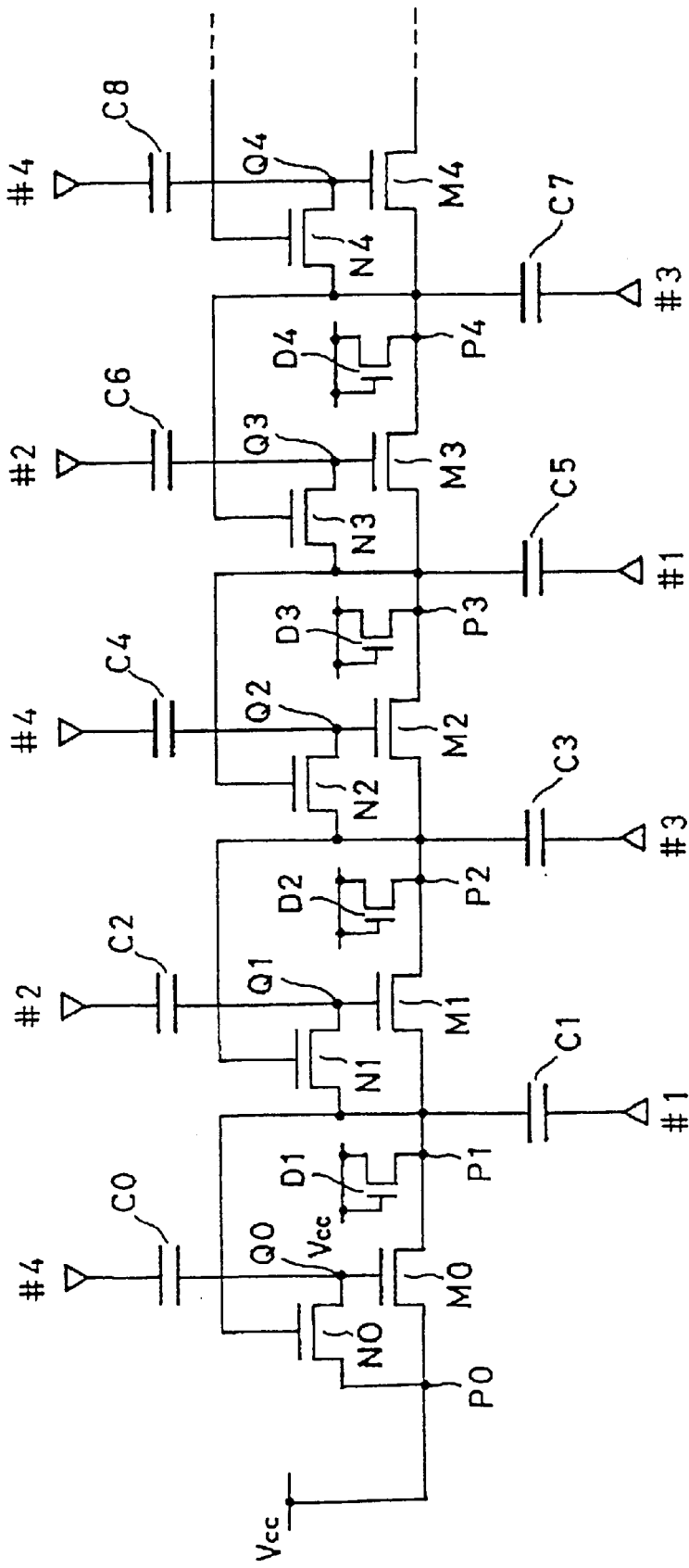
FIG. 3 is a circuit diagram illustrative of the second conventional charge pump circuits, wherein the second conventional charge pump circuit is operated with four-phase clock signals and has n-type MOS field effect transistors and capacitors in addition boosting up MOS field effect transistors.
Figure 4:
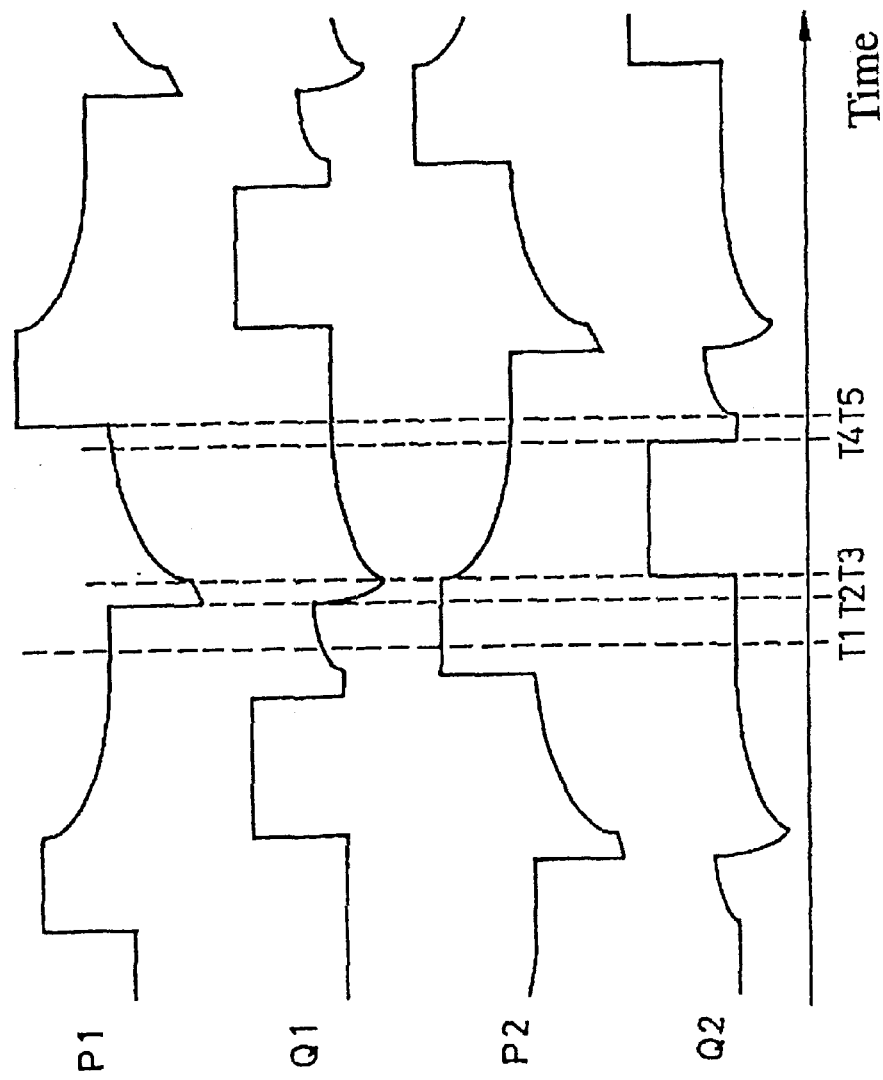
FIG. 4 is a diagram illustrative of waveforms of the individual nodes P1, P2, P3, P4 . . . Pn of the second conventional charge pump circuit in operation as illustrated in FIG. 3.
Figure 8:
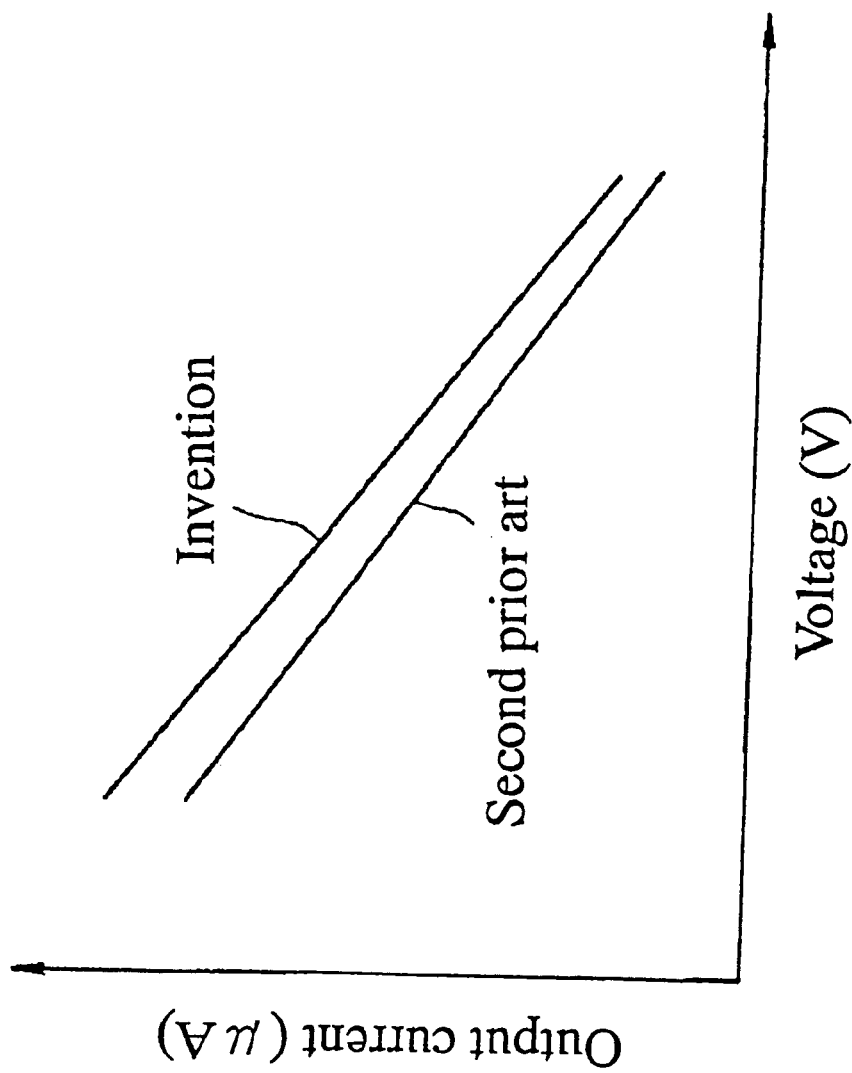
FIG. 8 is a diagram illustrative of variations in output currents of the first novel charge pump circuit of FIG. 5 and the second conventional charge pump Circuit of FIG. 3 versus risen voltage levels.

FIG. 8 is a diagram illustrative of variations in output currents of the first novel charge pump circuit of FIG. 5 and the second conventional charge pump circuit of FIG. 3 versus risen voltage levels. This shows that the first novel charge pump circuit is more efficient in charge transfer than the second conventional charge pump circuit.

Second Embodiment

A second embodiment according to the present invention will be described in detail with reference to FIG. 9 which is a circuit diagram illustrative of the second novel charge pump circuits, wherein the second novel charge pump circuit is operated with four-phase clock signals. The second novel charge pump circuit is to fall or drop the ground level voltage down to the predetermined negative voltage level. The second novel charge pump circuit has a series connection of p-type MOS field effect transistors M0, M1, M2, M3, M4 . . . Mn. The p-type MOS field effect transistors M0, M1, M2, M3, M4 . . . Mn are connected in series through nodes P1, P2, P3, P4 . . . Pn. The drain electrode of the first stage p-type MOS field effect transistor M0 is connected through a node P0 to a ground line GND which is connected to a ground level power supply. A source of the final stage p-type MOS field effect transistor Mn is connected through a final stage output node Pn+1 to an output terminal of the charge pump circuit. The second novel charge pump circuit also has p-type boost-up MOS field effect transistors N0, N1, N2, N3, N4 . . . Nn which are connected in series between the nodes P0, P1, P2, P4 . . . Pn and gates of the p-type MOS field effect transistors M0, M1, M2, M3, M4 . . . Mn. The second novel charge pump circuit has capacitors C0, C1, C2, C3, C4, C5, C6, C7, C8 . . . C2n. The capacitors C0, C1, C2, C3, C4, C5, C6, C7, C8 . . . C2n have first terminals and second terminals which receive four-phase clock signals #1, #2, #3 and #4. The nodes P1, P2, P3, P4 . . . Pn are also connected to the first terminals of the odd number stage capacitors C1, C3, C5, C7 . . . C2n−1. The odd number stage capacitors C1, C3, C5, C7 . . . C2n−1 have second terminals which receive the first and third phase clock signals #1 and #3 alternately. The first terminals of the even number stage capacitors C0, C2, C4, C6, C8 . . . C2n are connected to gates of the p-type MOS field effect transistors M0, M1, M2, M3, M4 . . . Mn. The even number stage capacitors C0, C2, C4, C6, C8 . . . C2n have second terminals which receive the second and fourth phase clock signals #2 and #4 alternately. The p-type boost-up MOS field effect transistors N0, N1, N2, N3, N4 . . . Nn have gates which are connected to the third next stage nodes P3, P4, P5, P6, P7 . . . Pn+1. Those third next stage nodes P3, P4, P5, P6, P7 . . . Pn+1 are also connected to the first terminals of the odd number stage capacitors C5, C7, . . . C2n−1 having the second terminals which receive the first and third phase clock signals #1 and #3 alternately. The second novel charge pump circuit further has p-type transistor diodes D1, D2, D3, D4 . . . Dn which are connected in series between the ground line GND and the nodes P1, P2, P3, P4 . . . Pn respectively. Gates and drains of the p-type transistor diodes D1, D2, D3, D4 . . . Dn are connected to the ground line GND whilst sources of the p-type transistor diodes D1, D2, D3, D4 . . . Dn are connected to the nodes P1, P2, P3, P4 . . . Pn respectively. FIG. 10 is a diagram illustrative of waveforms of four phase clock signals #1, #2, #3 and #4 to be applied to the capacitors in the second novel charge pump circuit.

Namely, the gates of the p-type boost-up MOS field effect transistors N0, N1, N2, N3, N4 . . . Nn are connected to the third next stage nodes P3, P4, P5, P6, P7 . . . Pn+1 which are further connected to the first terminals of the third next stage capacitors C5, C7, . . . C2n−1 having the second terminals which receive the first and third phase clock signals #1 and #3 alternately, so that the gates of the p-type boost-up MOS field effect transistors N0, N1, N2, N3, N4 . . . Nn receive the third next stage clock signals #1 and #3. For example, the gate of the first stage p-type boost-up MOS field effect transistor N0 is connected to the fourth stage node P3 connected to the capacitor C5 so that the gate of the first stage p-type boost-up MOS field effect transistor N0 receives the first phase clock signal #1 through the capacitor C5. Further, the gate of the second stage p-type boost-up MOS field effect transistor N1 is connected to the fifth stage node P4 connected to the capacitor C7 so that the gate of the second stage p-type boost-up MOS field effect transistor N1 receives the third phase clock signal #3 through the capacitor C7.

Figure 9:
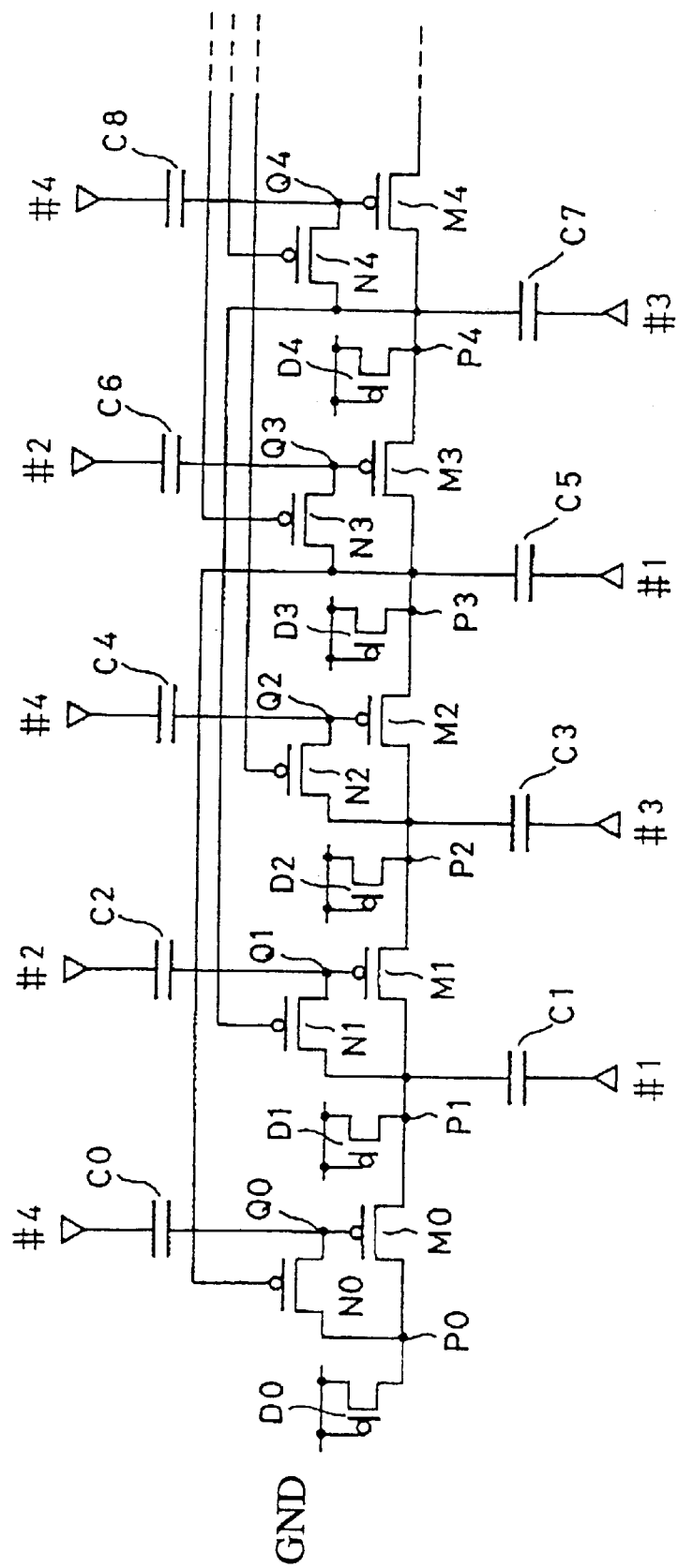
FIG. 9 is a circuit diagram illustrative of the second novel charge pump circuits, wherein the second novel charge pump circuit is operated with four-phase clock signals in a second embodiment in accordance with the present invention.
Figure 10:
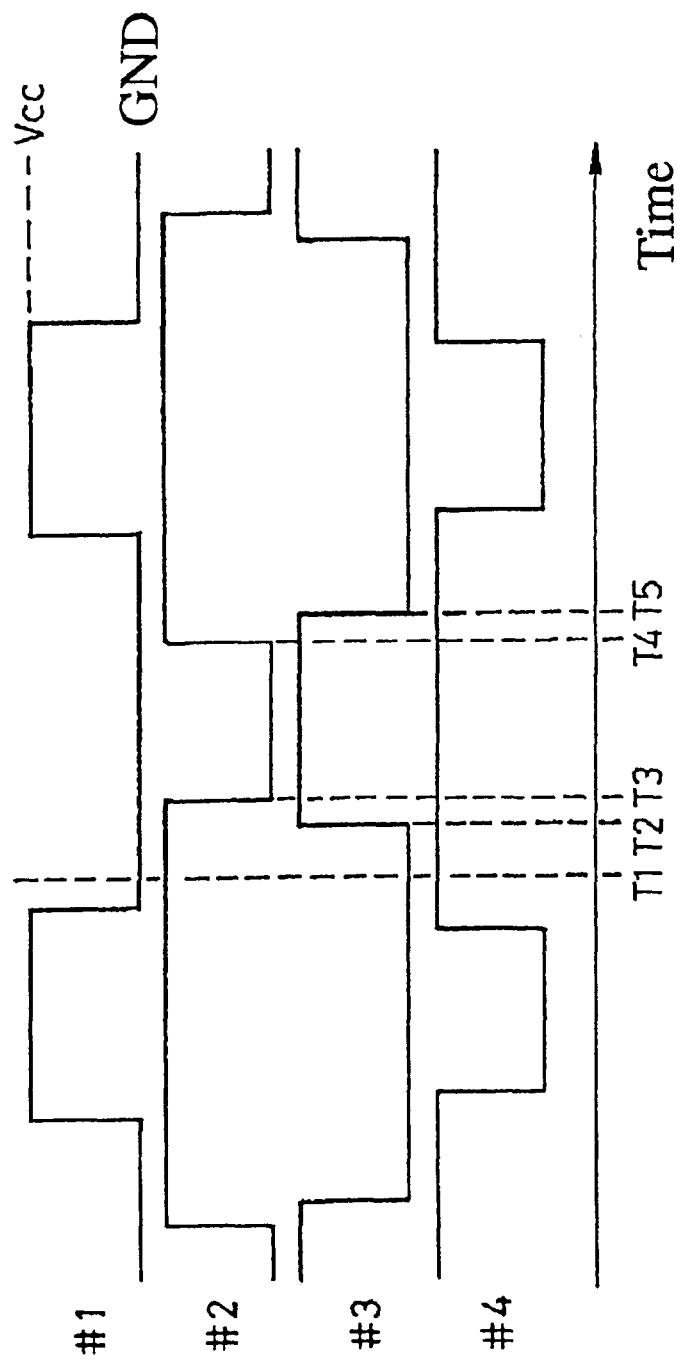
FIG. 10 is a diagram illustrative of waveforms of four phase clock signals #1, #2, #3 and #4 to be applied to the capacitors in the second novel charge pump circuit as illustrated in FIG. 9.
Figure 11:
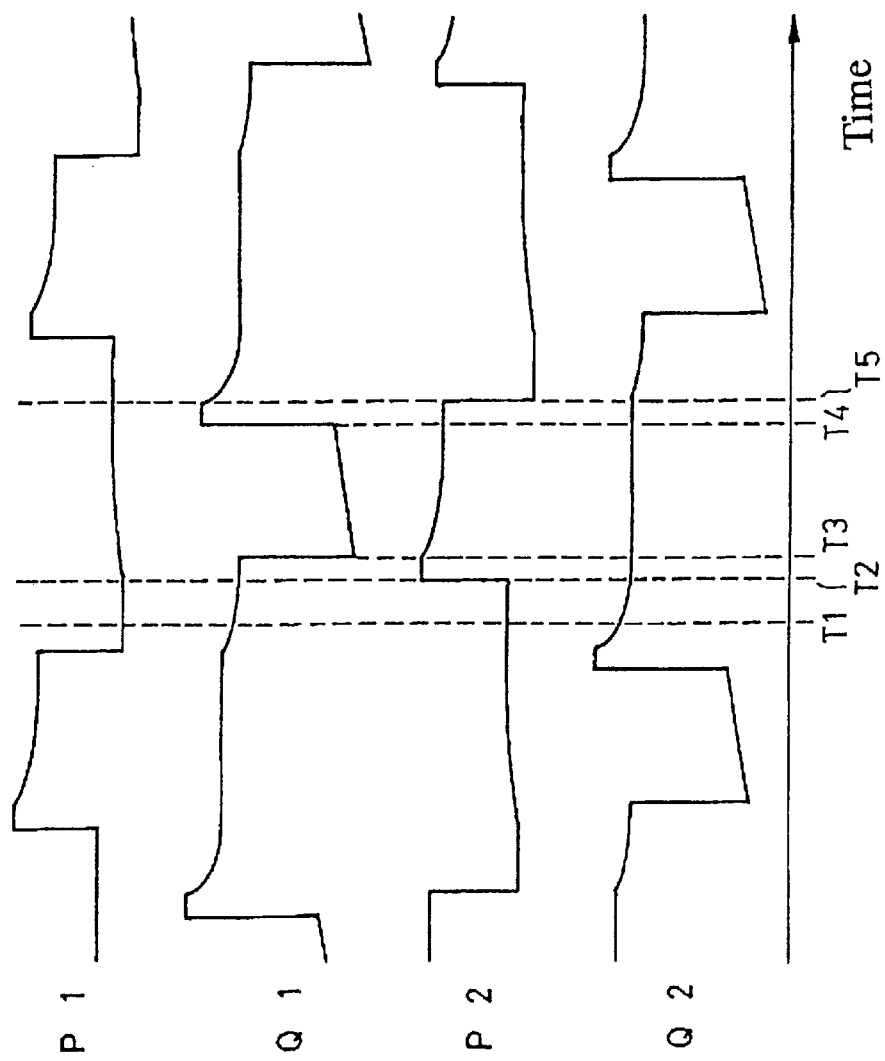
FIG. 11 is a diagram illustrative of waveforms of the individual nodes P1, P2, Q1, and Q2 of the second novel charge pump circuit in operation as illustrated in FIG. 9.

FIG. 11 is a diagram illustrative of waveforms of the individual nodes P1, P2, Q1, and Q2 of the second novel charge pump circuit in operation as illustrated in FIG. 9. When the time is T1, the second to fourth nodes P1, P2, P3 have voltages Vp1(T1), Vp2(T1) and Vp3(T1). The second and fourth phase clock signals #2 and #4 are in the high level, whilst the first and third phase clock signals #1 and #3 are in the low level. The gates of the p-type boost-up MOS field effect transistors N0, N1 and N2 are connected to the third next stage nodes P3, P4 and P5, for which reason the voltages Vp3(T1), Vp4(T1) and Vp5(T1) of the third next stage nodes P3, P4, P5 are applied to the gates of the p-type boost-up MOS field effect transistors N0, N1 and N2. The gates of the p-type MOS field effect transistors M0, M1 and M2 have voltages Vq0(T1), Vq1(T1), Vq2(T1) and Vq3(T1) respectively.

When the charge pump circuit is in the initial state of the negative boost-up process or where the drain of the transistor is connected to the ground line, the following equation is given.

$$Vpn(T1)-Vpn+3(T1)>Vtn$$

where Vtn is a threshold voltage of the transistor Ni.

Therefore, Vqn(T1)=Vpn(T1) is given.

In the middle and later time periods of the negative boost-up process or in the initial time pried of the negative boost-up process, the transistor on the output side stage has voltage relationships defined by the following equation.

$$Vpn(T1)-Vpn+3(T1)<Vtn$$

Therefore, Vpn(T1)=Vpn+3(T1)−Vtn is given.

Since the maximum potential difference between the voltage levels Vpn+3(T1) and Vpn(T1) is 2×Vcc and this Vcc corresponds to a difference between high and low levels of the four phase clock signals, the gates of the p-type boost-up MOS field effect transistors N0 . . . Nn receive lower voltages, whereby the charge transfer capabilities of the p-type boost-up MOS field effect transistors N0 . . . Nn are improved, thereby to allow a high speed falling of the potentials Vq0(T1) . . . Vqn(T1) of the nodes Q0 . . . Qn up to the required and predetermined low voltage levels respectively.

When the time is T2, the third phase clock signal #3 is high level, and the voltage levels Vp2(T2) of the node P2 is dropped to the following level.

$$Vp2(T1)-\{Ci/(Ci+Cj)\}Vcc$$

When the time is T3, then the second phase clock signal #2 is low level, and the voltage level Vq1(T3) of the node Q1 has already been fallen and further boosted down by −{Ck/(Ck+Cg)}Vcc, for which reason the high efficiency of the charge transfer through the transistor M1 to the output side is further improved.

$$Vq1(T1)-\{Ck/(Ck+Cg)\}Vcc$$

where Ck is the capacitance of the capacitors connected to the gates of the transistors M0 . . . Mn, and Cg is the parasitic capacitance of nodes Q0, Q1, Q2, Q3, Q4, . . . Qn which are connected to the gates of the transistors M0 . . . Mn respectively.

When the time is T4, the transistors M0 . . . Mn turn OFF again.

When the time is T5, then the voltage level Vp2(T5) of the node P2 is fallen whereby the second novel charge pump circuit enters into the same operation as when the time is T1 but different in phase by 180 degrees therefrom.

The above sequential operations of the second novel charge pump circuit are repeated so that the charges are transferred to the final stage node Pn+1 connected to the source of the final stage transistor Mn, whereby the final stage node Pn+1 has the required low voltage level. The second novel charge pump circuit is capable of high speed voltage falling operation in a short time period without, however, providing any additional transistor.

Third Embodiment

Figure 12:
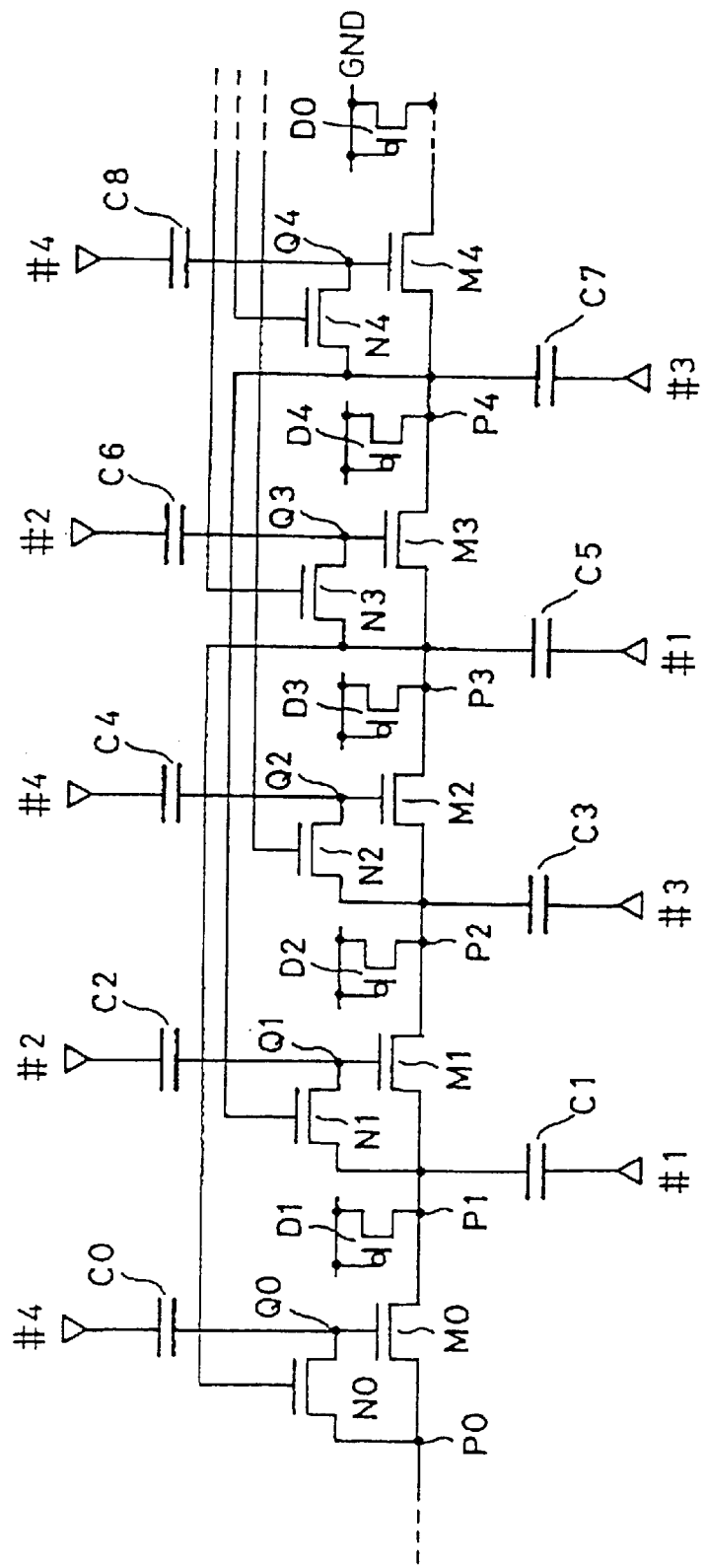
FIG. 12 is a circuit diagram illustrative of the third novel charge pump circuits, wherein the third novel charge pump circuit is operated with four-phase clock signals in a third embodiment in accordance with the present invention.
Figure 13:
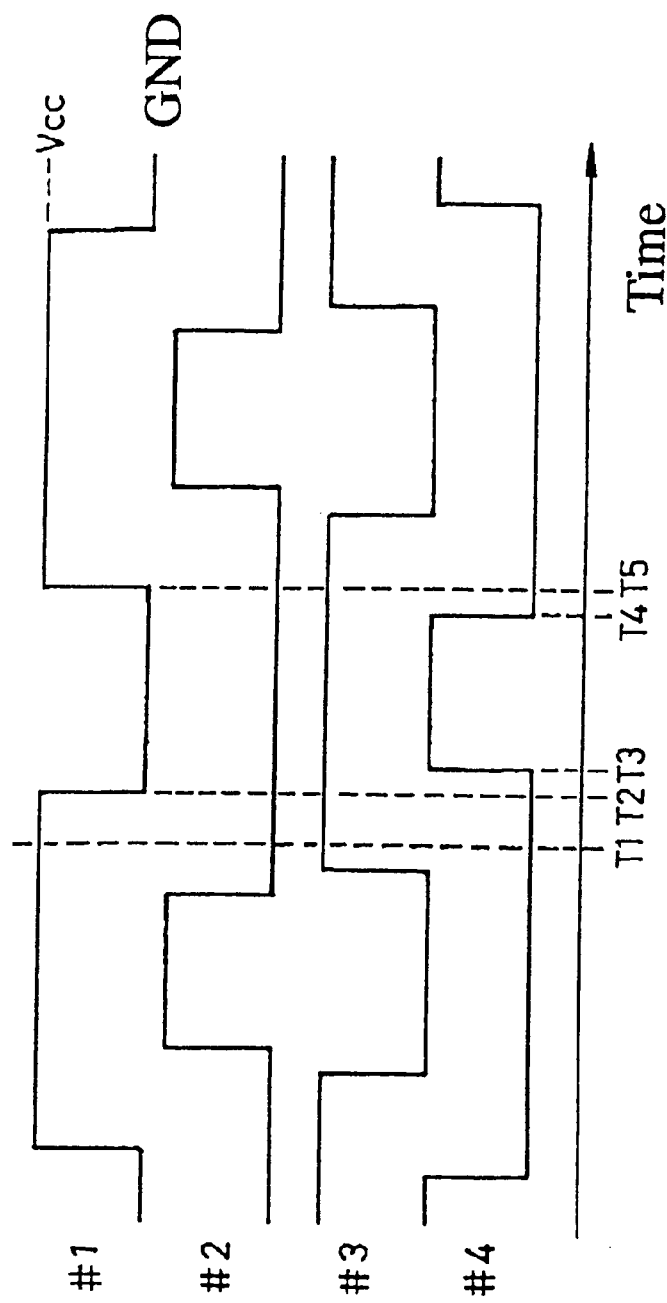
FIG. 13 is a diagram illustrative of waveforms of four phase clock signals #1, #2, #3 and #4 to be applied to the capacitors in the third novel charge pump circuit as illustrated in FIG. 12.

A third embodiment according to the present invention will be described in detail with reference to FIG. 12 which is a circuit diagram illustrative of the third novel charge pump circuits, wherein the third novel charge pump circuit is operated with four-phase clock signals. The third novel charge pump circuit is to fall or drop the ground level voltage down to the predetermined negative voltage level. The third novel charge pump circuit has a series connection of n-type MOS field effect transistors M0, M1, M2, M3, M4 . . . Mn. The n-type MOS field effect transistors M0, M1, M2, M3, M4 . . . Mn are connected in series through nodes P1, P2, P3, P4 . . . Pn. The drain electrode of the final stage n-type MOS field effect transistor M0 is connected through a node P0 to a ground line GND which is connected to a ground level power supply. A source of the final stage n-type MOS field effect transistor Mn is connected through a final stage output node Pn+1 to an output terminal of the charge pump circuit. The third novel charge pump circuit also has n-type boost-up MOS field effect transistors N0, N1, N2, N3, N4 . . . Nn which are connected in series between the nodes P0, P1, P2, P4 . . . Pn and gates of the n-type MOS field effect transistors M0, M1, M2, M3, M4 . . . Mn. The third novel charge pump circuit has capacitors C0, C1, C2, C3, C4, C5, C6, C7, C8 . . . C2n. The capacitors C0, C1, C2, C3, C4, C5, C6, C7, C8 . . . C2n have first terminals and second terminals which receive four-phase clock signals #1, #2, #3 and #4. The nodes P1, P2, P3, P4 . . . Pn are also connected to the first terminals of the odd number stage capacitors C1, C3, C5, C7 . . . C2n−1. The odd number stage capacitors C1, C3, C5, C7 . . . C2n−1 have second terminals which receive the first and third phase clock signals #1 and #3 alternately. The first terminals of the even number stage capacitors C0, C2, C4, C6, C8 . . . C2n are connected to gates of the n-type MOS field effect transistors M0, M1, M2, M3, M4 . . . Mn. The even number stage capacitors C0, C2, C4, C6, C8 . . . C2n have second terminals which receive the second and fourth phase clock signals #2 and #4 alternately. The n-type boost-up MOS field effect transistors N0, N1, N2, N3, N4 . . . Nn have gates which are connected to the third next stage nodes P3, P4, P5, P6, P7 . . . Pn+1. Those third next stage nodes P3, P4, P5, P6, P7 . . . Pn+1 are also connected to the first terminals of the odd number stage capacitors C5, C7, . . . C2n−1 having the second terminals which receive the first and third phase clock signals #1 and #3 alternately. The third novel charge pump circuit further has p-type transistor diodes D1, D2, D3, D4 . . . Dn which are connected in series between the ground line GND and the nodes P1, P2, P3, P4 . . . Pn respectively. Gates and drains of the p-type transistor diodes D1, D2, D3, D4 . . . Dn are connected to the ground line GND whilst sources of the p-type transistor diodes D1, D2, D3, D4 . . . Dn are connected to the nodes P1, P2, P3, P4 . . . Pn respectively. FIG. 13 is a diagram illustrative of waveforms of four phase clock signals #1, #2, #3 and #4 to be applied to the capacitors in the third novel charge pump circuit.

Figure 14:
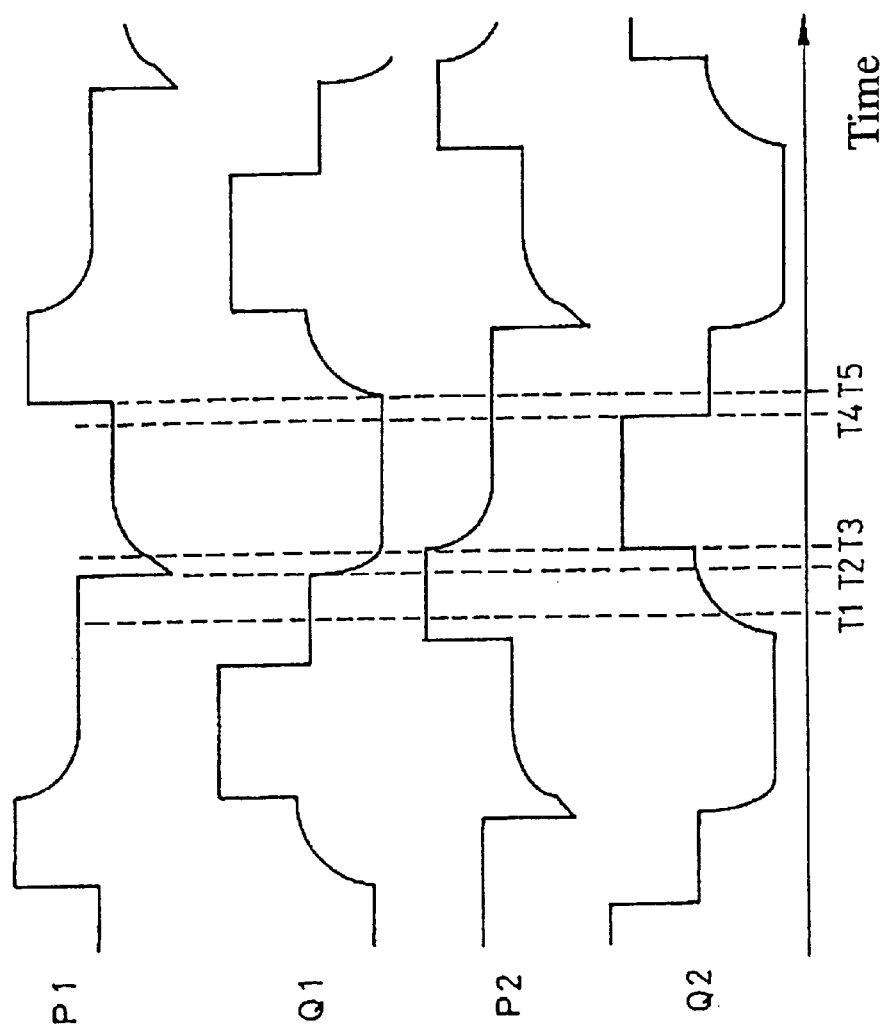
FIG. 14 is a diagram illustrative of waveforms of the individual nodes P1, P2, Q1, and Q2 of the third novel charge pump circuit in operation as illustrated in FIG. 12.

Namely, the gates of the n-type boost-up MOS field effect transistors N0, N1, N2, N3, N4 . . . Nn are connected to the third next stage nodes P3, P4, P5, P6, P7 . . . Pn+1 which are further connected to the first terminals of the third next stage capacitors C5, C7, . . . C2n−1 having the second terminals which receive the first and third phase clock signals #1 and #3 alternately, so that the gates of the n-type boost-up MOS field effect transistors N0, N1, N2, N3, N4 . . . Nn receive the third next stage clock signals #1 and #3. For example, the gate of the first stage n-type boost-up MOS field effect transistor N0 is connected to the fourth stage node P3 connected to the capacitor C5 so that the gate of the first stage n-type boost-up MOS field effect transistor N0 receives the first phase clock signal #1 through the capacitor C5. Further, the gate of the second stage n-type boost-up MOS field effect transistor N1 is connected to the fifth stage node P4 connected to the capacitor C7 so that the gate of the second stage n-type boost-up MOS field effect transistor N1 receives the third phase clock signal #3 through the capacitor C7 FIG. 14 is a diagram illustrative of waveforms of the individual nodes P1, P2, Q1, and Q2 of the third novel charge pump circuit in operation as illustrated in FIG. 12. Similarly to the second novel charge pump circuit, the above sequential operations of the third novel charge pump circuit are repeated so that the charges are transferred to the final stage node Pn+1 connected to the source of the final stage transistor Mn, whereby the final stage node Pn+1 has the required low voltage level. The third novel charge pump circuit is capable of high speed voltage falling operation in a short time period without, however, providing any additional transistor.

Fourth Embodiment

A fourth embodiment according to the present invention will be described in detail with reference to FIG. 15 which is a circuit diagram illustrative of the fourth novel charge pump circuits, wherein the fourth novel charge pump circuit is operated with four-phase clock signals. The fourth novel charge pump circuit has a series connection of p-type MOS field effect transistors M0, M1, M2, M3, M4 . . . Mn. The p-type MOS field effect transistors M0, M1, M2, M3, M4 . . . Mn are connected in series through nodes P1, P2, P3. P4 . . . Pn. The drain electrode of the final stage p-type MOS field effect transistor M0 is connected through a node P0 to a high voltage line Vcc which is connected to a power supply. A source of the final stage p-type MOS field effect transistor Mn is connected through a final stage output node Pn+1 to an output terminal of the charge pump circuit. The fourth novel charge pump circuit also has p-type boost-up MOS field effect transistors N0, N1, N2, N3, N4 . . . Nn which are connected in series between the nodes P0, P1, P2, P4 . . . Pn and gates of the p-type MOS field effect transistors M0, M1, M2, M3, M4 . . . Mn. The fourth novel charge pump circuit has capacitors C0, C1, C2, C3, C4, C5, C6, C7, C8 . . . C2n. The capacitors C0, C1, C2, C3, C4, C5, C6, C7, C8 . . . C2n have first terminals and second terminals which receive four-phase clock signals #1, #2, #3 and #4. The nodes P1, P2, P3, P4 . . . Pn are also connected to the first terminals of the odd number stage capacitors C1, C3, C5, C7 . . . C2n−1. The odd number stage capacitors C1, C3, C5, C7 . . . C2n−1 have second terminals which receive the first and third phase clock signals #1 and #3 alternately The first terminals of the even number stage capacitors C0, C2, C4, C6, C8 . . . C2n are connected to gates of the p-type MOS field effect transistors M0, M1, M2, M3, M4 . . . Mn. The even number stage capacitors C0, C2, C4, C6, C8 . . . C2n have second terminals which receive the second and fourth phase clock signals #2 and #4 alternately. The p-type boost-up MOS field effect transistors N0, N1, N2, N3, N4 . . . Nn have gates which are connected to the third next stage nodes P3, P4, P5, P6, P7 . . . Pn+1. Those third next stage nodes P3, P4, P5, P6, P7 . . . Pn+1 are also connected to the first terminals of the odd number stage capacitors C5, C7, . . . C2n−1 having the second terminals which receive the first and third phase clock signals #1 and #3 alternately. The fourth novel charge pump circuit further has n-type transistor diodes D1, D2, D3, D4 . . . Dn which are connected in series between the high voltage line Vcc and the nodes P1, P2, P3, P4 . . . Pn respectively. Gates and drains of the n-type transistor diodes D1, D2, D3, D4 . . . Dn are connected to the high voltage line Vcc whilst sources of the n-type transistor diodes D1, D2, D3, D4 . . . Dn are connected to the nodes P1, P2, P3, P4 . . . Pn respectively. FIG. 16 is a diagram illustrative of waveforms of four phase clock signals #1, #2, #3 and #4 to be applied to the capacitors in the fourth novel charge pump circuit.

Namely, the gates of the p-type boost-up MOS field effect transistors N0, N1, N2, N3, N4 . . . Nn are connected to the third next stage nodes P3, P4, P5, P6, P7 . . . Pn+1 which are further connected to the first terminals of the third next stage capacitors C5, C7, . . . C2n−1 having the second terminals which receive the first and third phase clock signals #1 and #3 alternately, so that the gates of the p-type boost-up MOS field effect transistors N0, N1, N2, N3, N4 . . . Nn receive the third next stage clock signals #1 and #3. For example, the gate of the first stage p-type boost-up MOS field effect transistor N0 is connected to the fourth stage node P3 connected to the capacitor C3 so that the gate of the first stage p-type boost-up MOS field effect transistor N0 receives the first phase clock signal #1 through the capacitor C5. Further, the gate of the second stage p-type boost-up MOS field effect transistor N1 is connected to the fifth stage node P4 connected to the capacitor C7 so that the gate of the second stage p-type boost-up MOS field effect transistor N1 receives the third phase clock signal #3 through the capacitor C7.

Figure 15:
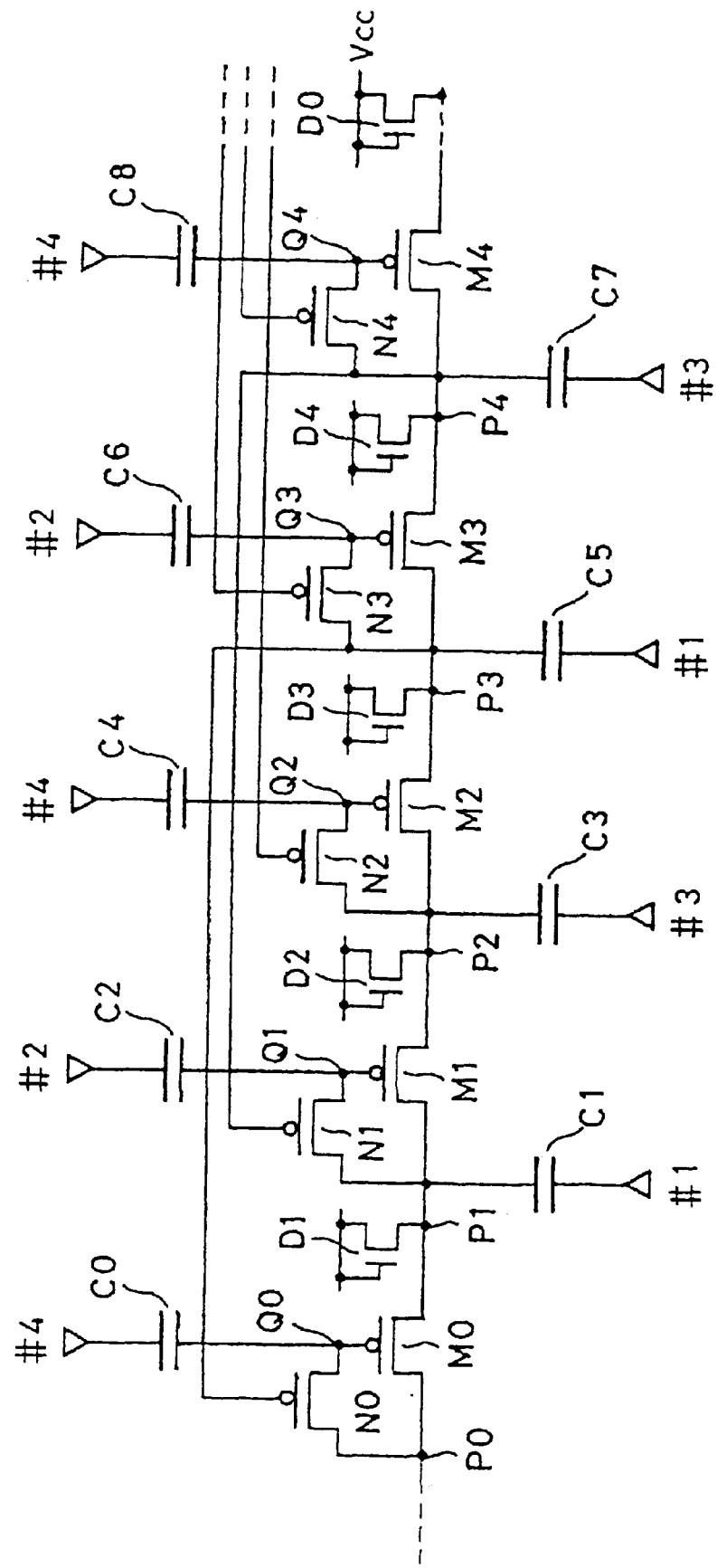
FIG. 15 is a circuit diagram illustrative of the fourth novel charge pump circuits, wherein the fourth novel charge pump circuit is operated with four-phase clock signals in a fourth embodiment in accordance with the present invention.
Figure 16:
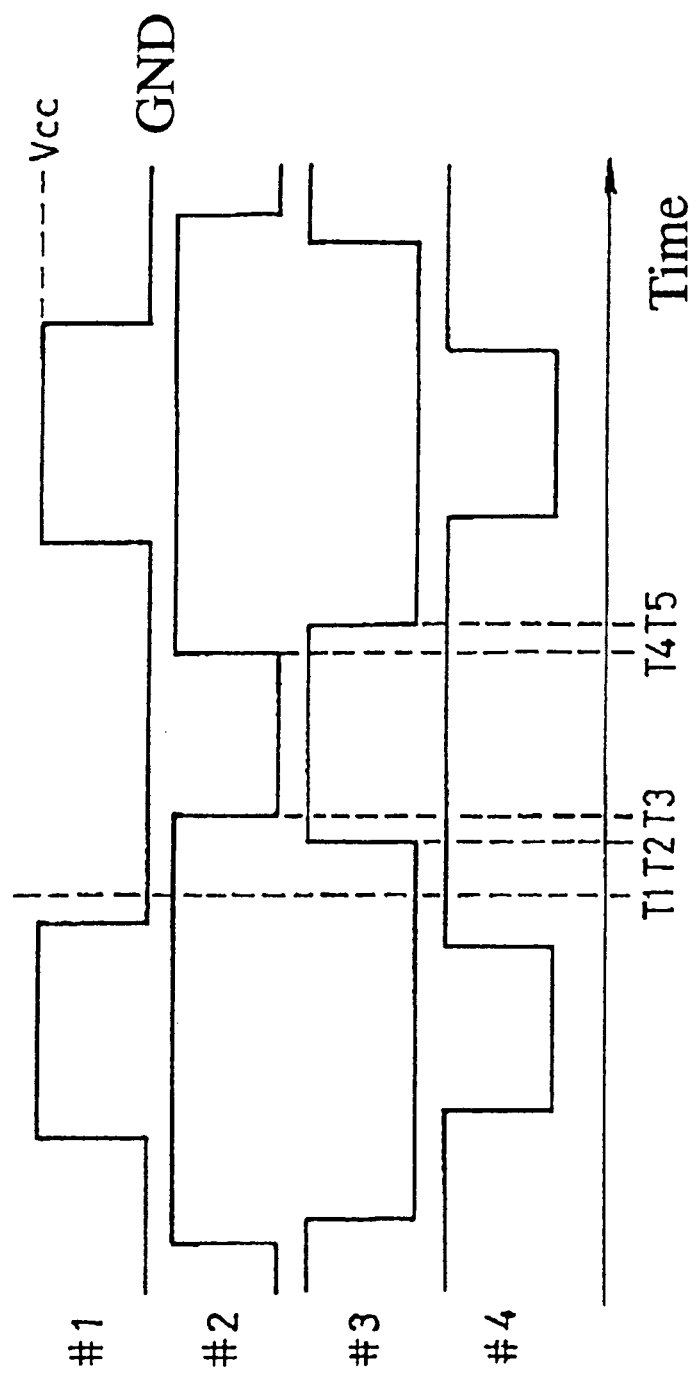
FIG. 16 is a diagram illustrative of waveforms of four phase clock signals #1, #2, #3 and #4 to be applied to the capacitors in the fourth novel charge pump circuit as illustrated in FIG. 15.
Figure 17:
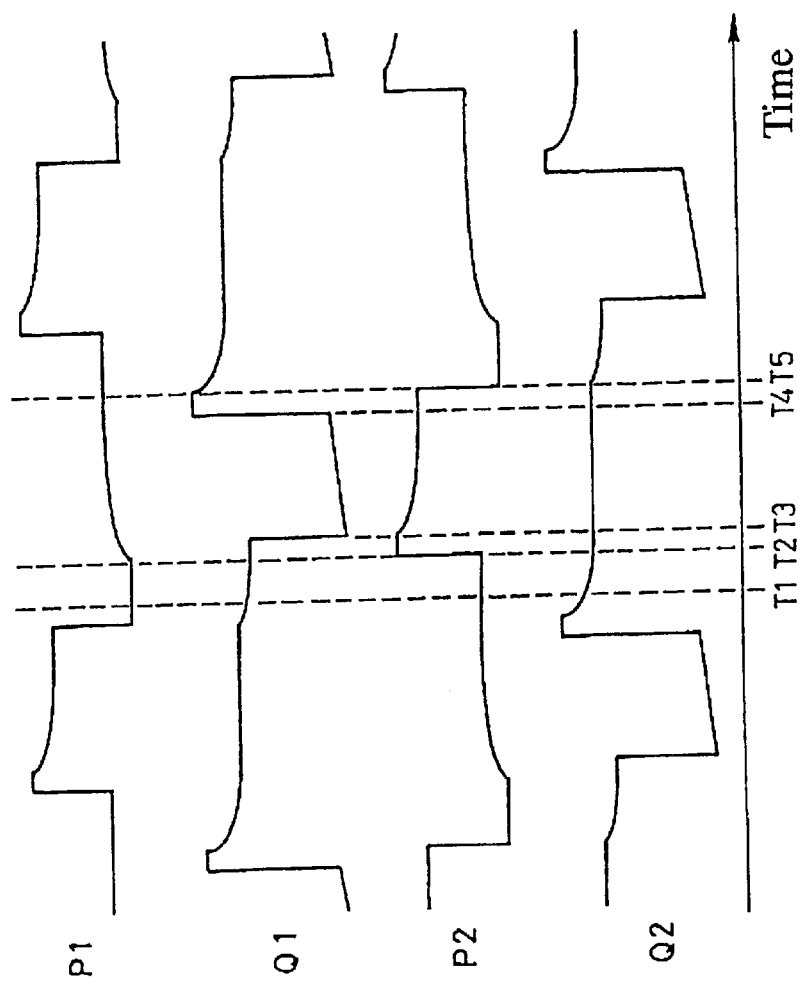
FIG. 17 is a diagram illustrative of waveforms of the individual nodes P1, P2, Q1, and Q2 of the fourth novel charge pump circuit in operation as illustrated in FIG. 15.

FIG. 17 is a diagram illustrative of waveforms of the individual nodes P1, P2, Q1, and Q2 of the fourth novel charge pump circuit in operation as illustrated in FIG. 15. Similarly to the first novel charge pump circuit, the above sequential operations of the fourth novel charge pump circuit are repeated so that the charges are transferred to the final stage node Pn+1 connected to the source of the final stage transistor Mn, whereby the final stage node Pn+1 has the required voltage level. The fourth novel charge pump circuit is capable of high speed voltage rising operation in a short time period without, however, providing any additional transistor.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A charge pump circuit operable with at least first to fourth phase clock signals, said charge pump circuit comprising:
charge transfer devices that are connected in series through nodes, said charge transfer devices being connected to first side capacitors which are applied with second and fourth phase clock signals alternately so as to control charge transfer operations of said charge transfer devices with said second and fourth phase clock signals,
said nodes being connected to second side capacitors which are applied with first and third clock signals,
each of said charge transfer devices including a charge transfer field effect transistor connected in series between input and output ones of said nodes on opposite sides of said each charge transfer device and a boosting field effect transistor connected in series between a gate of a respective said charge transfer field effect transistor and said input one of said nodes,
wherein a gate of each of said boosting field effect transistor is connected to a respective one of said nodes that is positioned closer to an output of said charge pump circuit than an output node of the corresponding charge transfer device by at least one of said charge transfer devices.

2. The charge pump circuit as claimed in claim 1, wherein said respective one of said nodes is positioned closer to said output of said charge pump circuit than an output node of the corresponding charge transfer device by two of said charge transfer devices.

3. The charge pump circuit as claimed in claim 1, wherein an input of a first one of said series connection of charge transfer devices is connected to a high voltage line supplying a power voltage level so that said charge pump circuit is operated to increase said power voltage level to a predetermined higher voltage level than said power voltage level.

4. The charge pump circuit as claimed in claim 3, wherein said each charge transfer device further comprises a semiconductor device with a predetermined threshold voltage connected between said high voltage line and said output one of said nodes, so that said semiconductor device is operated to supply said output one of said nodes with a subtraction voltage level which corresponds to a subtraction of said predetermined threshold voltage from said power voltage level.

5. The charge pump circuit as claimed in claim 4, wherein said semiconductor device comprises a transistor diode.

6. The charge pump circuit as claimed in claim 1, wherein an input of a first one of said series connection of charge transfer devices is connected to a ground voltage line supplying a ground voltage level so that said charge pump circuit is operated to decrease said ground voltage level to a predetermined lower voltage level than said ground voltage level.

7. The charge pump circuit as claimed in claim 6, wherein said each charge transfer device further further comprises a semiconductor device with a predetermined threshold voltage connected between said ground line and said output one of said nodes, so that said semiconductor device is operated to supply said output one of said nodes with a subtraction voltage level which corresponds to a subtraction of said predetermined threshold voltage from said ground voltage level.

8. The charge pump circuit as claimed in claim 7, wherein said semiconductor device comprises a transistor diode.

9. A charge pump circuit operable with first to fourth phase clock signals, said charge pump circuit comprising:
charge transfer devices that are connected in series through nodes, said charge transfer devices being connected to first side capacitors which are applied with second and fourth phase clock signals alternately so as to control charge transfer operations of said charge transfer devices with said second and fourth phase clock signals,
said nodes being connected to second side capacitors which are applied with first and third clock signals,
each of said charge transfer devices including a charge transfer field effect transistor connected in series between input and output ones of said nodes on opposite sides of said each charge transfer device and a boosting field effect transistor connected in series between a gate of a respective said charge transfer field effect transistor and said input one of said nodes, an input of a first one of said series connection of charge transfer devices is connected to a high voltage line supplying a power voltage level so that said charge pump circuit is operated to increase said power voltage level to a predetermined higher voltage level than said power voltage level, wherein a gate of each of said boosting field effect transistor is connected to a respective one of said nodes that is positioned closer to an output of said charge pump circuit than an output node of the corresponding charge transfer device by at least one of said charge transfer devices.

10. The charge pump circuit as claimed in claim 9, wherein said respective one of said nodes is positioned closer to said output of said charge pump circuit than an output node of the corresponding charge transfer device by two of said charge transfer devices.

11. The charge pump circuit as claimed in claim 10, wherein said each charge transfer device further comprises a semiconductor device with a predetermined threshold voltage connected between said high voltage line and said output one of said nodes, so that said semiconductor device is operated to supply said output one of said nodes with a subtraction voltage level which corresponds to a subtraction of said predetermined threshold voltage from said power voltage level.

12. The charge pump circuit as claimed in claim 11, wherein said semiconductor device comprises a transistor diode.

13. A charge pump circuit operable with first to fourth phase clock signals, said charge pump circuit comprising:

charge transfer devices that are connected in series through nodes, said charge transfer devices being connected to first side capacitors which are applied with second and fourth phase clock signals alternately so as to control charge transfer operations of said charge transfer devices with said second and fourth phase clock signals, said nodes being connected to second side capacitors which are applied with first and third clock signals, each of said charge transfer devices including a charge transfer field effect transistor connected in series between input and output ones of said nodes on opposite sides of said each charge transfer device and a boosting field effect transistor connected in series between a gate of a respective said charge transfer field effect transistor and said input one of said nodes, an input of a first one of said series connection of charge transfer devices is connected to a ground voltage line supplying a ground voltage level so that said charge pump circuit is operated to decrease said ground voltage level to a predetermined lower voltage level than said ground voltage level, wherein a gate of each of said boosting field effect transistor is connected to a respective one of said nodes that is positioned closer to an output of said charge pump circuit than an output node of the corresponding charge transfer device by at least one of said charge transfer devices.

14. The charge pump circuit as claimed in claim 13, wherein said respective one of said nodes is positioned closer to said output of said charge pump circuit than an output node of the corresponding charge transfer device by two of said charge transfer devices.

15. The charge pump circuit as claimed in claim 13, wherein said each charge transfer device further further comprises a semiconductor device with a predetermined threshold voltage connected between said ground line and said output one of said nodes, so that said semiconductor device is operated to supply said output one of said nodes with a subtraction voltage level which corresponds to a subtraction of said predetermined threshold voltage from said ground voltage level.

16. The charge pump circuit as claimed in claim 15, wherein said semiconductor device comprises a transistor diode.

* * * * *